UNITED STATES PATENT OFFICE.

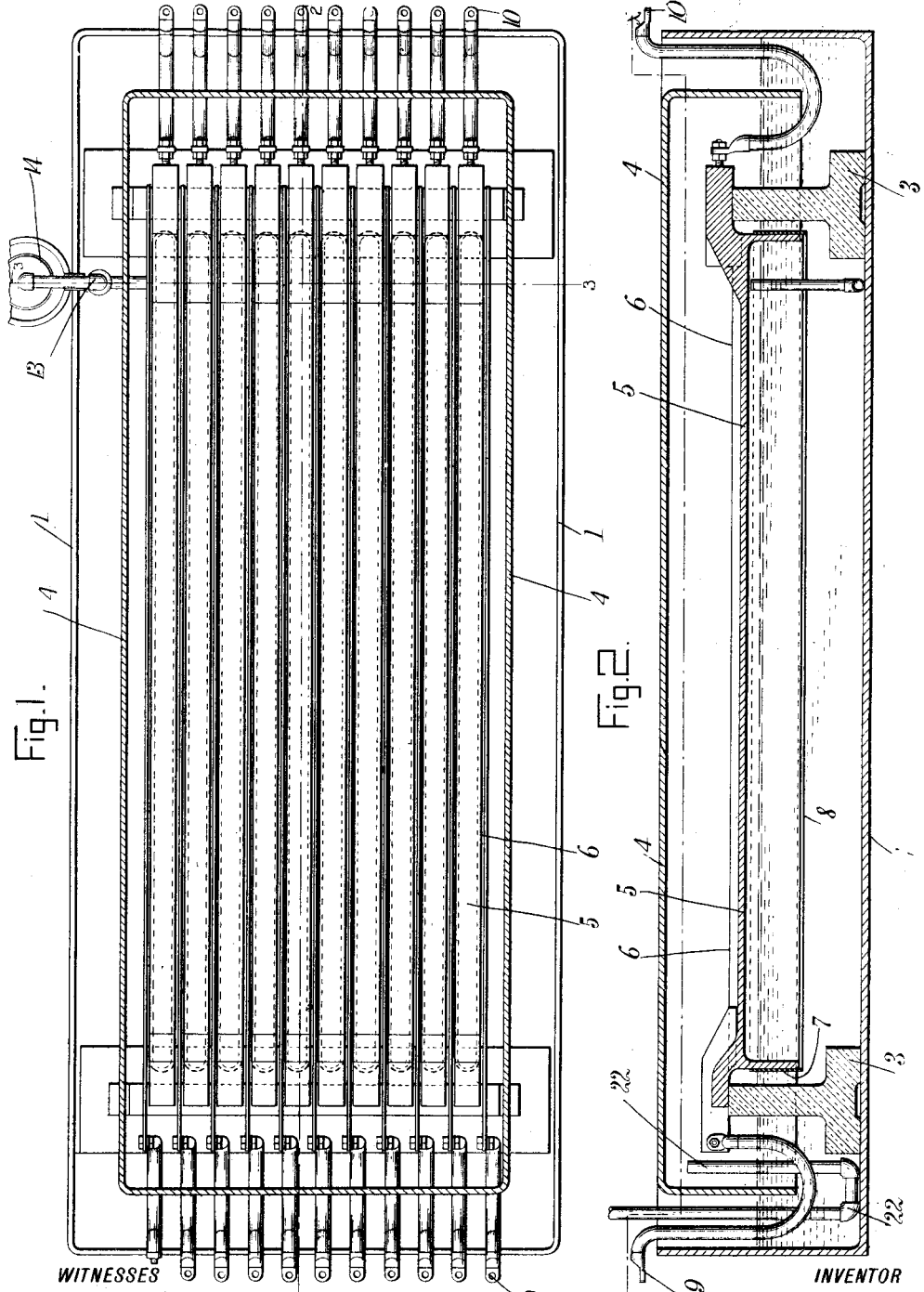

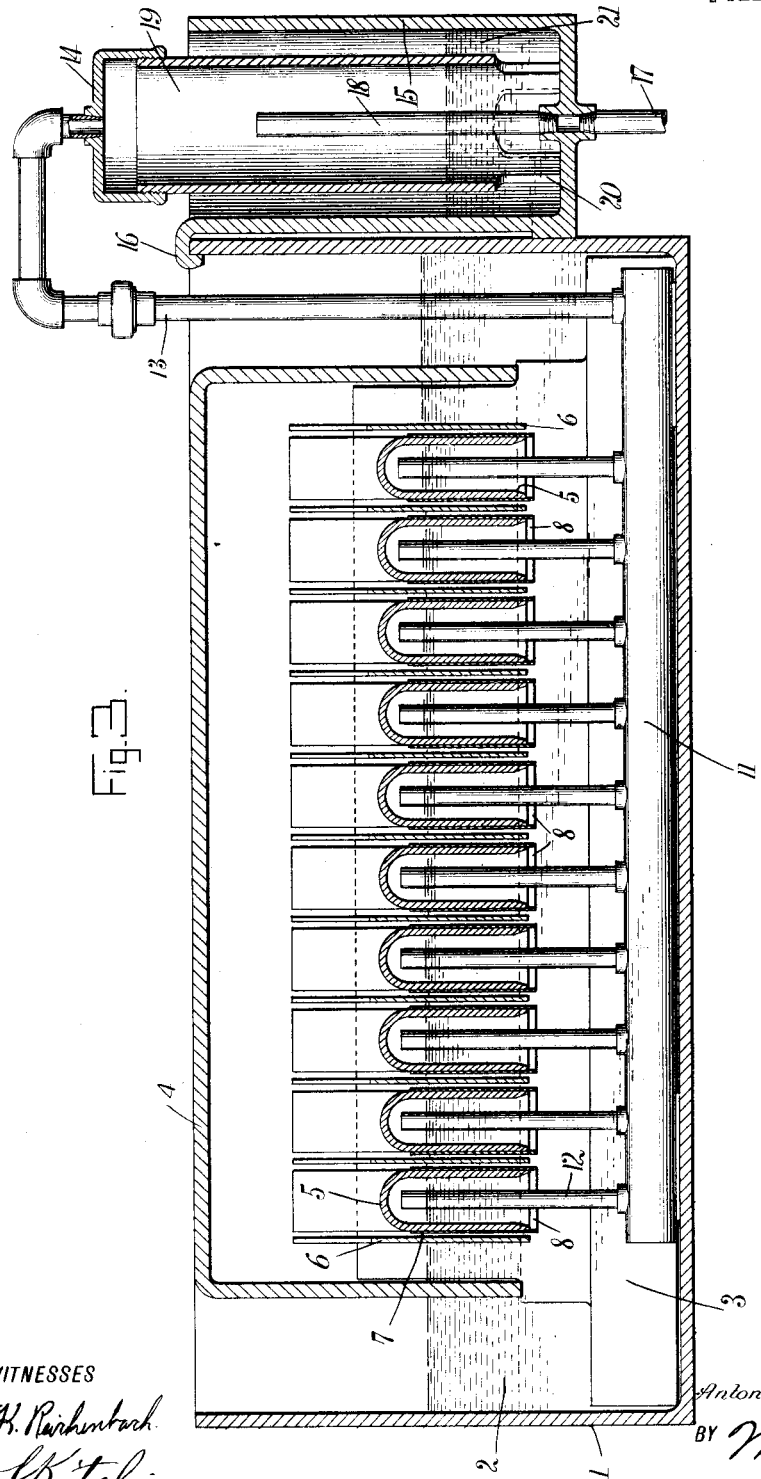

ANTONIO TOMMASINI, OF NEW YORK, N. Y.

ELECTROLYTIC CELL.

1,035,060.  Specification of Letters Patent.  Patented Aug. 6, 1912.

Application filed March 21, 1912. Serial No. 685,203.

*To all whom it may concern:*

Be it known that I, ANTONIO TOMMASINI, a citizen of the United States, and a resident of the city of New York, borough of Brooklyn, in the county of Kings and State of New York, have invented a new and Improved Electrolytic Cell, of which the following is a full, clear, and exact description.

This invention relates to devices for separating water into its constituent parts, and particularly to an electrolytic cell designed to thoroughly separate the hydrogen from the oxygen during the process of separation so that pure oxygen will be secured.

The object in view is to provide a compact arrangement of means for passing a current of electricity through a solution containing water in such a manner that the hydrogen bubbles created thereby will be directed to one point of discharge and the oxygen bubbles will be directed to another point of discharge.

Another object of the invention is to provide a receptacle designed to receive water or a mixture of water and acid, in which is positioned a plurality of cup-shaped devices provided on their outer surfaces with an insulating covering projecting below the cup-shaped structures and above the water line, these cup-shaped structures being associated with a plurality of plates arranged adjacent thereto having their lower edges in line with the lower edges of the cup-shaped devices whereby current passing from the plates to the cup-shaped devices will be compelled to travel around said insulating covering through the liquid in the receptacle.

A still further object of the invention is the provision of improved means for separating water into its constituent parts, including a substantially inverted cup-shaped structure and a piping extending from or near the upper inner surface of the cup-shaped structure to a point above the receptacle in which it is positioned, and means associated with said pipe for normally guiding gases therefrom to a point of discharge, but permitting an exhausting of the gases therefrom directly into the atmosphere when the pressure of the gases has increased to a predetermined extent.

In carrying out the objects of the invention, a receptacle of any desired kind is provided into which is arranged a main discharge pipe having a plurality of upstanding discharge tubes and over each of the discharge tubes is arranged a receptacle substantially U-shaped in cross section. This receptacle is open at the bottom, but closed at the top and closed at each end so that any gases formed interiorly thereof will have as a discharge opening said tubes and said discharge pipe. Surrounding each of these inverted members is an insulating strip of material, preferably formed of rubber, which extends above the water or other liquid positioned in the receptacle and projects below the lower edge of the inverted devices. Arranged adjacent each of the inverted devices is an electrical contacting plate connected to one side of a source of electrical supply. The opposite side of the same source of electrical supply is connected with the inverted devices so that in operation current will flow from the plates through the water or other fluid around the lower edge of the insulation and to the inverted devices, whereby oxygen bubbles may pass upwardly along each of the plates to a receiving housing, and the hydrogen bubbles will pass to the upper part of the inverted members and from thence through the tube into the discharge pipe, from which it is led by a connecting pipe to a safety device. From the safety device the hydrogen is directed by a suitable piping to a storage tank or to a proper discharge point. The safety device is formed with a receptacle open at the top, into which is positioned a receptacle open at the bottom and having notches cut therein at the bottom extending toward the top, but in this receptacle is arranged water or other liquid, provided with less head than the water or liquid in the separating device, so that in case the pressure of the hydrogen reaches a predetermined point, the same will force the liquid out of the inverted receptacle and will eventually pass out to the atmosphere.

A practical embodiment of the invention is represented in the accompanying drawings forming a part of this specification, in which similar characters of reference indicate corresponding parts in all the views.

Figure 1 is a section through Fig. 2, approximately on the line $x$—$x$; Fig. 2 is a section through Fig. 1, approximately on the line 2—2; and Fig. 3 is a section through Fig. 1 on the line 3—3, the same being shown on an enlarged scale.

Referring to the accompanying drawings by numerals, 1 indicates a receptacle formed of any desired material, in which a liquid 2 is positioned. The liquid 2 may be water mixed with an alkali, as sodium or potassium hydroxid. Positioned in the tube is a support 3, designed to hold suspended an inverted housing 4, a plurality of inverted substantially U-shaped receptacles 5, and a plurality of plates 6. The plates 6 and the receptacles 5 must be made of conducting material, but in order to cause the current passing from one to the other to leave at a certain point and enter at a certain point, an insulating covering 7 is provided for each of the U-shaped members 5. The covering 7 projects to a point above the liquid line and to a point below the lower edge of the members 5, whereby an overhanging apron 8 is provided. One side of a source of electrical supply is connected to the plates 6 by suitable insulated connecting members 9, while the opposite side of the source of supply of current is connected by members 10 to the inverted U-shaped members 5. Arranged in the bottom of the receptacle 2 is a discharge pipe 11, to which are secured a plurality of tubes 12, one tube being provided for each of the inverted receptacles 5, and projecting to a point near the upper part thereof. Of course if it is desired, the tubes 12 could extend outward to an independent discharge point, though preferably the hydrogen passing through these tubes is forced into the pipe 11 and from thence out the connecting pipe 13 to a safety device 14.

The safety device 14 may be positioned at any desired point above or below, or on the same level as the receptacle 1. Preferably, however, the safety device 14 is provided with a receptacle 15 open at the upper end and formed with a hook 16 adapted to fit over the upper edge of the receptacle 1. Connected to the bottom of the receptacle 15 is a discharge pipe 17 which leads the hydrogen gas to any desired discharge point, and which receives the hydrogen gas from a pipe 18 extending partially to the top of the receptacle 15. Arranged within the receptacle 15 and surrounding the pipe 18 is an inverted receptacle 19 formed with slots or openings 20 at the lower end. Positioned between the receptacle 15 and the lower end of the receptacle 19 is a fluid 21 which may be water, or any other desired fluid. The depth of the fluid 21 between the upper edge of the slots 20 and the water line is preferably less than the depth of the liquid in the inverted receptacle 5. This is to provide for a less head of water in the safety device 14 than in the receptacle 5, so that when the pressure of the hydrogen gas becomes so great as to press the fluid out of the receptacle 5, or rather almost out of the receptacle 5, the same will press the water out of the receptacle 19 and pass out the slots 20 so as to relieve the pressure in the inverted receptacle 5. It will be evident that if the pressure in the inverted receptacle 5 becomes so great that the hydrogen escapes therefrom it would pass up into the housing 4 and mix with the oxygen and an explosive mixture would be the result.

As heretofore stated the oxygen is adapted to pass upward into the housing 4. As the pressure in the housing 4 increases the same will to a certain extent assist the hydrogen in decreasing the liquid confined in the housing 4, the housing 4 of course inclosing all of the inverted receptacle 5. In order to draw off the oxygen from the housing 4, a pipe 22 is provided which is adapted to direct the oxygen to any desired storage tank or other discharge point.

When the device is in operation current is switched on to the inverted receptacle 5 and the plates 6, the positive pole being switched on to the plate 6 so that the oxygen will pass upward into the housing 4, while the hydrogen will pass into the inverted receptacle 5. It will, of course, be evident that if the current was reversed the collection of the respective gases would be reversed. From Fig. 3 it will be noted also that the inverted receptacles 5 are arranged near each other and the plates arranged therebetween occupy most of the space so that as the oxygen bubbles are formed on the plates the same would be crowded to the top of the fluid and forced therefrom into the space above, whereby in a certain sense the reluctance of the oxygen to leave the fluid would be overcome by the mechanical action of the gas itself, the gas itself re-acting against the specific gravity of the fluid. Special attention is called to the arrangement of the apron 8 which depends below the lower edges of the inverted receptacle 5 and the plates 6. If this apron was arranged even with the lower edges of the plates and the inverted receptacle 5, the gases evolved would mix to a large extent, but by compelling the electricity to pass downward around the insulating apron 8, the hydrogen and oxygen bubbles are entirely separated. In a device of this character it has been found that the gas bubbles are formed at the point or place that the current leaves the metal and at the point or place where the current enters the metal. As the lowermost point of the plates 6 and the inverted receptacle 5 are above the insulating apron 8, the bubbles will naturally rise instead of move downward so that a correct separation of the different kinds of gases is assured.

In arranging the insulation 7 the same is caused to adhere tightly to the inverted receptacle 5 so that no current can enter the cup 5 on the side to which the insulation is secured. If current did enter between the insulation and the cup 5 hydrogen bubbles would result and would pass upward into the inverted receptacle 5 and mix with the oxygen so that in arranging the insulation 7 the same is caused to tightly contact with the cup 5. In constructing the plates 6 and the inverted receptacle 5 the same may be made of various kinds of metals; preferably the plate 6 is made from nickel or nickel steel, and the inverted receptacle or cup 5 is preferably made from cast iron, though other materials may be used.

In the drawings the construction has been shown in which a plurality of the inverted receptacles 5 are used, but it will be evident that if desired a single inverted receptacle 5 could be used with a single plate 6. It will be also evident that the plate 6 could be made of any desired contour or shape, provided that the lower edge thereof was positioned substantially on the same level as the lower edge of the inverted receptacle 5. In the drawings the insulation 7 has also been shown as rubber which is ordinarily the preferable material, but it will be evident that porcelain, glass, or other insulating material could be used with advantage, the same of course, being arranged with the overhanging apron 8 for causing the current to pass downward from one electrode and pass upward to the opposite electrode through the electrolyte.

Regardless of what particular material the insulation be made of it is necessary that the same shall engage tightly the inverted cup 5 so that the current cannot enter the inverted receptacle 5 except on the interior and the bottom edge in order that the gases evolved will be positively evolved above the point which would permit the same to mix.

Having thus described my invention I claim as new and desire to secure by Letters Patent:—

1. In a device of the character described, a receptacle, an inverted housing arranged in said receptacle, a discharge tube opening into the interior of said housing, a plurality of plates arranged in said housing defining electrodes having the same polarity, an inverted substantially U-shaped receptacle in cross section arranged adjacent said plates, an insulating covering for said inverted devices, said insulating covering projecting below the lower edge of said inverted devices, means for connecting said inverted devices with a source of current for causing the same to have a different polarity to said plates, and a gas discharge means arranged in each of said inverted devices, said receptacle being adapted to contain a fluid containing as part of its constituents hydrogen and oxygen gas whereby when current is passed through said plates to said inverted devices hydrogen gas will be evolved within said inverted devices and oxygen gas will be evolved at the side of said plates.

2. In a device of the character described, a receptacle designed to contain an aqueous fluid, an inverted receptacle arranged in said first mentioned receptacle and adjusted so as to be partially submerged in said fluid, an insulating covering for said inverted receptacle projecting to a point below the lower edge of said inverted receptacle, means for connecting said inverted receptacle with a source of electrical supply for causing the same to act as an electrode, an electrode having an opposite polarity arranged adjacent said inverted receptacle, a tubular member leading from the interior of said inverted receptacle to a discharge point, a housing arranged over said inverted receptacle and said electrode, and a tubular member in communication with the interior of said housing for acting as a discharge member therefor.

3. In a device of the character described, a receptacle supplied with an aqueous fluid, an inverted housing arranged in said receptacle and partly submerged in said fluid, an inverted receptacle arranged in said housing partially submerged in said fluid, a covering of rubber for said inverted receptacle, said covering of rubber projecting below said inverted receptacle for defining a depending apron, an electrode arranged adjacent said inverted receptacle, said electrode being positioned so that the lower edge thereof is substantially in the same plane as the lower edge of the said inverted receptacle, means for connecting said inverted receptacle with a source of current for causing the said inverted receptacle to be of a different polarity from said electrode, means for leading the gases evolved in said inverted receptacle to a point of discharge, and means for leading the gases evolved adjacent said electrode and caught by said housing to a point of discharge.

4. In a device of the character described, a receptacle adapted to receive an aqueous fluid, means arranged in said receptacle for receiving oxygen and hydrogen gas from said aqueous fluid, a discharge member connected with the means for receiving hydrogen gas, and an automatic pressure limiting device connected with said discharge means for preventing the hydrogen gas from entering that part of said receptacle containing oxygen gas.

5. In a device of the character described, a receptacle adapted to receive an aqueous fluid, means arranged therein for receiving hydrogen gas evolved from said fluid, means for guiding a current of electricity through said fluid for causing the separation of hydrogen gas from said fluid, discharge means connected with the means for receiving the hydrogen gas, a safety device connected with said discharge means for limiting the pressure of the hydrogen gas, said safety device comprising a receptacle adapted to contain a quantity of liquid, an inverted receptacle formed with slots therein at the lowermost point, and a discharge tube extending from near the upper part of the inverted receptacle through the bottom of the first mentioned receptacle, whereby when pressure in the safety device reaches a predetermined point the same will force the fluid therein downward until the gas is permitted to escape through said slots into the surrounding receptacle and from thence into the atmosphere.

6. In a device of the character described, a receptacle adapted to receive an aqueous fluid, means arranged in said receptacle for receiving oxygen gas, means for receiving hydrogen gas, said gases being adapted to be evolved from said aqueous fluid, a discharge member connected with the means for receiving hydrogen gas, and a safety device for said discharge member designed to cause the discharge of the hydrogen gas into the atmosphere before pressure in the discharge member has reached a predetermined extent, whereby the oxygen and hydrogen gases are prevented from mixing.

7. In a device of the character described, a receptacle adapted to receive an aqueous fluid, means arranged in said receptacle for receiving oxygen and hydrogen gases from said aqueous fluid, said last mentioned means being formed with separate compartments for said gases, a discharge member connected to the compartment containing the hydrogen gas, and a safety device connected with said discharge member, said safety device being formed with a receptacle, a tubular member mounted in said receptacle provided with a plurality of apertures near the bottom of the receptacle, a head of fluid arranged in said receptacle and said tubular member for normally sealing said apertures, and a discharge pipe extending from the space above said head of fluid, said head of fluid being of such resistance as to normally prevent the escape of the hydrogen gas through said apertures, but adapted to permit such escape when the pressure in said discharge pipe has reached a predetermined point.

In testimony whereof I have signed my name to this specification in the presence of two subscribing witnesses.

ANTONIO TOMMASINI.

Witnesses:
A. L. KITCHIN,
PHILIP D. ROLLHAUS.

---

Copies of this patent may be obtained for five cents each, by addressing the "Commissioner of Patents, Washington, D. C."